(12) United States Patent
Aixala et al.

(10) Patent No.: US 9,688,260 B2
(45) Date of Patent: Jun. 27, 2017

(54) VEHICLE COMPRISING AN AIR COMPRESSOR SYSTEM AND METHOD FOR OPERATING A VEHICLE AIR COMPRESSOR SYSTEM

(75) Inventors: Luc Aixala, Soucieu-en-Jarrest (FR); Christophe Long, Brindas (FR); Philippe Le Brusq, Lyons (FR)

(73) Assignee: Volvo Truck Corporation, Göteborg (SE)

( * ) Notice: Subject to any disclaimer, the term of this patent is extended or adjusted under 35 U.S.C. 154(b) by 1231 days.

(21) Appl. No.: 13/130,712

(22) PCT Filed: Nov. 28, 2008

(86) PCT No.: PCT/IB2008/003699
§ 371 (c)(1),
(2), (4) Date: May 23, 2011

(87) PCT Pub. No.: WO2010/061237
PCT Pub. Date: Jun. 3, 2010

(65) Prior Publication Data
US 2011/0231047 A1    Sep. 22, 2011

(51) Int. Cl.
*F04B 49/06* (2006.01)
*B60T 13/00* (2006.01)
*B60W 20/00* (2016.01)
*B60T 17/02* (2006.01)

(52) U.S. Cl.
CPC .................................. *B60T 17/02* (2013.01)

(58) Field of Classification Search
USPC ............................................. 701/22; 417/231
See application file for complete search history.

(56) References Cited

U.S. PATENT DOCUMENTS

| 4,798,053 A | 1/1989 | Chang |
| 6,036,449 A * | 3/2000 | Nishar .................. B60K 25/00 417/292 |
| 6,082,331 A * | 7/2000 | Barnes ................ F02D 41/3827 123/300 |
| 6,488,345 B1 * | 12/2002 | Woody ...................... B60L 7/10 180/165 |
| 6,534,958 B1 * | 3/2003 | Graber .................... F02B 63/04 123/2 |
| 6,554,088 B2 * | 4/2003 | Severinsky ............ B60H 1/004 180/65.23 |

(Continued)

FOREIGN PATENT DOCUMENTS

| EP | 1932704 A2 * | 6/2008 | .............. F02B 37/18 |
| WO | 9807588 A | 2/1998 | |

(Continued)

*Primary Examiner* — Jean-Paul Cass
(74) *Attorney, Agent, or Firm* — WRB-IP LLP

(57) ABSTRACT

A vehicle includes an air compressor system for supplying compressed air to an air consuming circuit, wherein the vehicle includes an arrangement for determining that the vehicle is coasting. The compressor system is controllable to deliver compressed air at a first power rate and at least at a second higher power rate, and it is controlled to deliver compressed air at the second higher power rate when it is determined that the vehicle is coasting. A method for operating an air compressor system for such a vehicle is also provided.

14 Claims, 2 Drawing Sheets

(56) References Cited

U.S. PATENT DOCUMENTS

| | | | |
|---|---|---|---|
| 6,716,546 B2* | 4/2004 | Oglesby | H01M 8/04111 429/444 |
| 6,718,751 B2* | 4/2004 | Mehail | F02G 3/02 60/39.6 |
| 6,988,358 B2* | 1/2006 | Mehail | F02G 3/02 60/39.6 |
| 7,004,273 B1 | 2/2006 | Gruenwald et al. | |
| 7,062,366 B2* | 6/2006 | Dussapt | F04B 49/022 701/100 |
| 7,344,201 B1* | 3/2008 | Bates | B60T 17/02 303/11 |
| 7,543,448 B2* | 6/2009 | Nakamura | E02F 9/2235 60/431 |
| 7,584,611 B2* | 9/2009 | Ariga | E02F 9/2235 60/431 |
| 7,908,055 B2* | 3/2011 | Leinung | B60T 17/02 701/36 |
| 2002/0112464 A1* | 8/2002 | Mehail | F02G 3/02 60/39.6 |
| 2003/0061795 A1* | 4/2003 | Mehail | F02G 3/02 60/39.6 |
| 2004/0136840 A1 | 7/2004 | Doerr et al. | |
| 2004/0163376 A1* | 8/2004 | Mehail | F02G 3/02 60/39.6 |
| 2004/0173396 A1* | 9/2004 | Rush | B60K 6/12 180/165 |
| 2004/0260441 A1* | 12/2004 | Dussapt | F04B 49/022 701/36 |
| 2008/0030071 A1* | 2/2008 | Duchet | B60G 17/0523 303/127 |
| 2008/0072588 A1* | 3/2008 | Ariga | E02F 9/2235 60/449 |
| 2008/0245065 A1* | 10/2008 | Nakamura | E02F 9/2235 60/426 |
| 2010/0314186 A1* | 12/2010 | Ma | B60K 6/12 180/165 |
| 2011/0083643 A1* | 4/2011 | Sturman | F01B 11/006 123/46 R |
| 2011/0259189 A1* | 10/2011 | Diekmeyer | B60T 17/004 95/10 |
| 2011/0276204 A1* | 11/2011 | Shutty | F02B 21/00 701/22 |
| 2013/0049364 A1* | 2/2013 | Teets | G08G 1/0129 290/45 |

FOREIGN PATENT DOCUMENTS

| | | | |
|---|---|---|---|
| WO | WO9807588 | * | 2/1998 |
| WO | 9817493 A | | 4/1998 |
| WO | WO2006/040975 A1 | * | 4/2006 |

* cited by examiner

VEHICLE COMPRISING AN AIR COMPRESSOR SYSTEM AND METHOD FOR OPERATING A VEHICLE AIR COMPRESSOR SYSTEM

The invention relates to the field of vehicles comprising compressed-air operated devices.

It is common for vehicles such as trucks and buses to comprise one or several compressed-air operated devices. Such devices can comprise service brakes, parking brakes, height adjustable suspensions, plus many additional vocational equipment which can be mounted on the vehicle. Overall consumption of compressed air by such devices can be fairly high, and some of the devices (such as the air operated brakes) are evidently crucial to the proper functioning of the vehicle. Therefore, a certain amount of pneumatic power needs to be available at all times when the vehicle is operational. This pneumatic power is provided by an air compressor system which is dimensioned to cope with the pneumatic needs of the vehicle. In most cases, the air compressor system delivers pressurized air to one or several accumulators, or air-tanks, where it is stored. The pressure in the tanks is usually regulated between at least a low threshold pressure and a high threshold pressure. When the pressure in the tanks falls below the low pressure threshold, the air delivery by the compressor is turned on and when the pressure level rises above the high pressure threshold, the air delivery is turned off. Consumption of pressurized air by the devices tends to reduce the pressure in the tanks, and, when it reaches the low pressure threshold, the air compressor system is controlled to deliver air and replenish the tank until the high pressure threshold is reached.

In most cases, the air compressor system comprises a reciprocating piston compressor and is therefore of the positive displacement type. The compressor is driven by the internal combustion engine which drives the driven wheels of the vehicle through a driveline. Therefore, the speed of the compressor and its flow output are linearly linked to the engine speed and increases only with the engine speed. To stop the delivery of compressed air, e.g. when the air tanks are full, the compressor can be simply unloaded or can be fully decoupled from the engine through the opening of a clutch.

With such a system, it is possible to manage the air pressure within the air tanks and to maintain it between the high and low pressure thresholds. Nevertheless, various documents have suggested to improve the operation of an air compressor system.

One major problem with conventional air compressor systems is that they operate only on the basis of the level of pressure in the tanks.

Document WO-98/07588 tackles the problem of making a better use of the times when the compressor can be run for "free", i.e. without any additional consumption of fuel to produce pneumatic power. Document WO-98/07588 therefore discloses an improved method for operating a compressor where the high pressure threshold at which the compressor is turned off. can be varied according to whether the vehicle is in a "pull operation" where the engine is effectively driving the vehicle, or whether the vehicle is in a "push operation". The latter case would seem to cover the cases where the vehicle is coasting, i.e. when the vehicle is moving without the engine providing positive driving torque to the wheels, and/or when it is braking. In such a "push operation", no fuel is delivered to the engine, provided that the engine injection system is equipped with a fuel cut-off feature, or at least only a minimum amount of fuel is consumed which is not used to provide motive power to the wheels. Thanks to the system disclosed in WO-98/07588, the air compressor system is allowed to over-fill the air tanks when the vehicle is performing such a "push operation", so that a little more of the pneumatic power is produced when the energy is "free". Nevertheless, this additional "free" pneumatic energy is obtained only when a "push operation" occurs at the same time as the pressure tanks are near their normal full level.

Document US-2004/136840 tackles a quite different problem. Indeed, this document states that, at least for some operating cycles of the vehicle such as operation on highway, the air compressors are in fact switched-on only 5 to 10 percent of the time, and are unloaded the rest of the time. If despite being unloaded, the compressor is still driven by the engine, it still consumes engine power without producing any pneumatic power, mostly due to component friction. Therefore, document US-2004/136840 suggests to provide a variable ratio transmission between the engine and the compressor so that the speed of the compressor, and therefore its power output, can be better adjusted to the instantaneous needs in terms of pneumatic power form the air-operated devices on-board the vehicle. In this document, the transmission is therefore controlled as a function of the engine speed and of the air demand and it has the goal to avoid frequent stopping of the compressor. As a result, the transmission is controlled to lengthen the percentage of time when the air compressor is turned-on. As a result, when operating on a highway, where the major part of the operating cycle of the vehicle is a "pull operation" as defined above, the disclosure of US-2004/136840 leads to an increase of the time at which the air compressor is turned-on during such a "pull operation".

Compared to the prior art, an aspect of the invention aims at making a better use of the "free" power available on the engine crankshaft or on the vehicle driveline, for example when the vehicle is coasting.

In view of the above, an aspect of the invention provides for a vehicle comprising an air compressor system for supplying compressed air to an air consuming circuit, wherein the vehicle comprises means for determining that the vehicle is coasting, characterized in that the compressor system is controllable to deliver compressed air at a first power rate and at least at a second higher power rate, and in that it is controlled to deliver compressed air at said second higher power rate when it is determined that the vehicle is coasting.

According to an aspect of the invention, said air compressor system does not pertain to the field of air compressors for compressing intake air for an internal combustion engine, but rather to compressors for supplying air to various air consuming circuits such as pneumatic operated service brakes, parking brakes, height adjustable suspensions, plus many additional vocational equipment which can be mounted on the vehicle and which need compressed air for their operation.

Also, a vehicle will be considered to be coasting inasmuch it is moving without any significant fuel delivery to an internal combustion traction engine (or electricity delivery to an electric traction engine), i.e. when the driver of the vehicle does not depress the accelerator pedal. Another way to define that the vehicle is coasting is when the vehicle is moving without the engine providing positive driving torque to the wheels, and/or when it is braking.

The invention also provides, according to an aspect thereof, for a method for operating a vehicle air compressor system, wherein the compressor system is controllable to deliver compressed air at a first power rate and at least at a second higher power rate, characterized in that said method comprises the step of determining whether the vehicle is coasting, and in that comprises the step of controlling the compressor system to deliver compressed air at said a second higher power rate depending on the status of vehicle operating parameters, including whether the vehicle is coasting.

DESCRIPTION OF THE INVENTION

Figure 1:
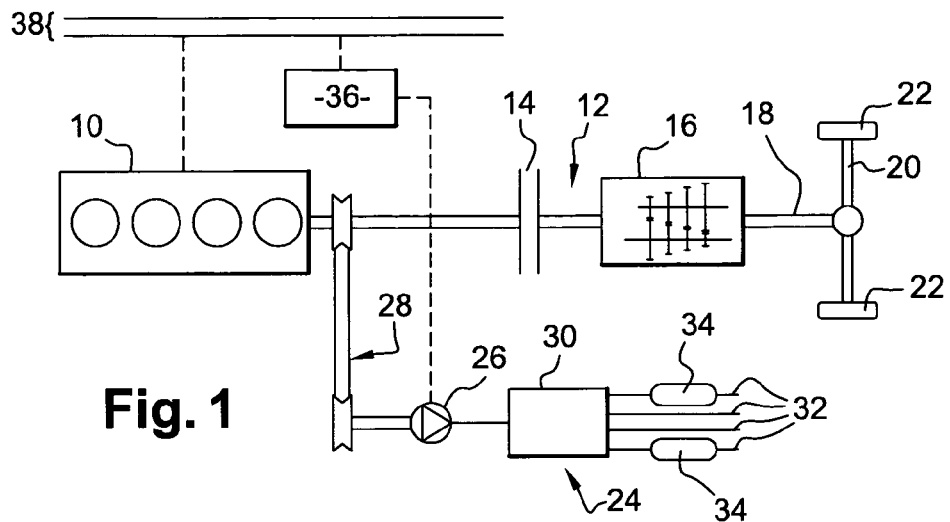
FIG. 1 is a schematic diagram of a vehicle having an air compressor system according to the prior art.

FIG. 1 represents very diagrammatically a conventional layout for an air compressor system on board a vehicle. Such vehicle comprises an engine 10, and a driveline 12 comprising for example a clutch 14, a gearbox 16, a transmission shaft 18, a driven axle 20 and driven wheels 22. The conventional air compressor system 24 comprises an air compressor 26 which is mechanically driven by the driveline 12 of the vehicle. For example, that air compressor 26 is driven via a belt and pulley transmission 28 by the engine crankshaft. The air compressor system 24 comprises for example a multi-circuit protection valve 30 downstream of the air compressor 26, said protection valve 30 being able to distribute the compressed air in a secure way between a number of air consuming circuits 32, some of which may be equipped with a compressed air accumulating system, such as a system comprising air tanks 34 in which air may be stored under pressurized form. In most modern vehicles, the air compressor system is driven by an electronic control system, for example comprising an unit 36, which may for example control the activation or deactivation of the air compressor 26 according to a number of parameters. Therefore, the electronic control unit 36 is part of the electronic system of the vehicle and can be a dedicated control unit or can be embedded within a multifunction electronic control unit. In a known way, the electronic control unit 36 may be connected to other control units within the vehicle either a through direct communication or through a databus 38. In this conventional layout, the air compressor 26 is constantly driven via the belt and pulley transmission 28 by the engine 10, and it can only be loaded or unloaded by the electronic control unit or by a simple pneumatic device, for example according to the pressure level in the air tanks 34.

Figure 2:
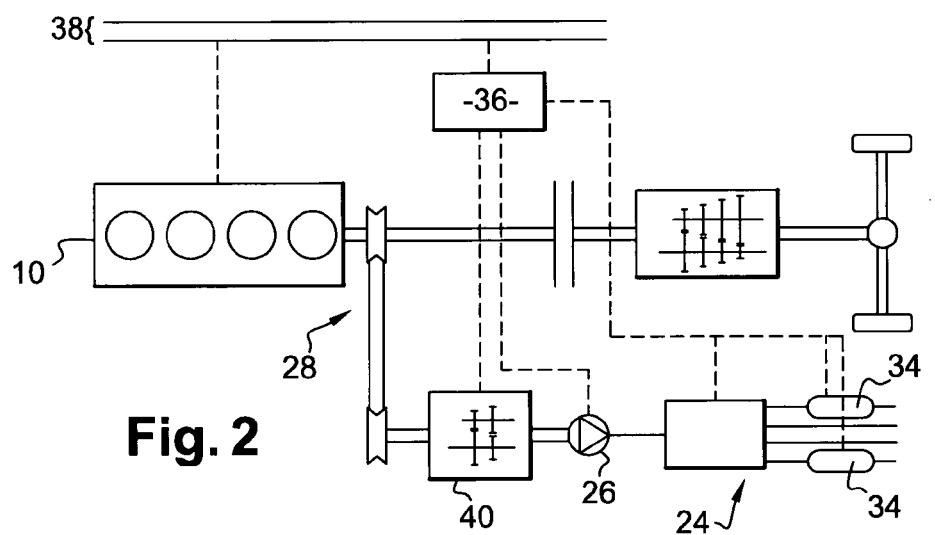
FIG. 2 is a schematic diagram of a vehicle having an air compressor system according a first embodiment of the invention.

On FIG. 2 is shown very diagrammatically a first embodiment of a vehicle equipped with an air compressor system according to the invention. Compared to the system of FIG. 1, the air compressor system 24 according to this first embodiment of the invention only differs by the fact that the air compressor 26 is driven by the belt and pulley transmission 28 through a gearbox 40. This gearbox 40 is a stepped gear transmission which can have for example two speed ratios, a high speed ratio and a low speed ratio. The gearbox can be of any conventional design. It could also comprise at least one planetary gear. The gearbox ratios are preferably controlled by the electronic control unit 36. As one can easily understand, depending on the ratio which is engaged, for a given speed of the engine 10, the air compressor 26 will be driven at a first low speed or a second high speed. Depending on the speed at which the air compressor is driven, it will deliver air at a lower or higher pressure and/or at a lower or higher flow. Therefore, it can be understood that depending on which ratio of the gearbox 40 is engaged, the air compressor system will deliver compressed air either at a first power rate or at a second higher power rate, the power of a flow of air being proportional to the product of its pressure times its flow. The compressed air delivered by air compressor 26 can be stored in the tanks 34 and/or directly consumed by the various air consumers on board the vehicle.

According to the invention, the gearbox 40 is controlled according to at least the determination of whether the vehicle is coasting or not. When it is determined that the vehicle is coasting, the higher speed ratio of the gearbox 40 can be selected so that the compressor is driven at higher speed. Such a determination can be performed either directly by the electronic control unit 36 or can be made available to said ECU 36, for example via the databus 38 or directly from another electronic control unit of the vehicle, for example an engine control unit. The determination that the vehicle is coasting can be very sophisticated and may for example involve monitoring the status of an accelerator pedal, of a brake pedal, of a fuel injection system, of the clutch 14, and/or of the gearbox 16, etc . . . . Basically, as explained above, the determination of whether a vehicle is coasting amounts to the determination of whether an extra consumption of mechanical power by the air compressor system 24 will or not amount to an extra consumption of fuel. Indeed, if the air compressor system 24 is controlled to deliver compressed air at higher power level, the mechanical power required to run the air compressor 26 will be higher. Therefore, thanks to the determination that the vehicle is coasting before switching the air compressor system to its high power rate delivery mode, it is made sure that this extra consumption of mechanical power will not incur any increase in the consumption of fuel. Of course, the electronic control system driving the air compressor system may take into account other vehicle operating parameters, and may, in some cases, depending on the status of one or several of these parameters, either drive the air compressor system in its high power rate when the vehicle is not coasting, or drive the air compression system in its low power rate when the vehicle is costing, in order to adapt to specific situations. Such parameters could include, amongst others, the braking intensity required by the driver, the engine speed, the vehicle speed, the air pressure in the tanks of 34, the engine available torque and/or the instantaneous air consumption by the air consumer circuits 32.

One example is that, when the air tanks 34 are full, it may be considered useless to nm the air compressor system at its higher power rate. On the other hand, when starting the vehicle, it may be desirable to run the air compressor system at its higher power rate to speed up the replenishment of the air tanks. Nevertheless, a typical example of an application of the invention would be when the air compressor is operated at a higher power rate when the vehicle is coasting, despite the vehicle is operating in a fairly steady state, with its air tanks midway between the high and low pressure thresholds, without any specifically high air demand from the consumers. Indeed, in a conventional system, the air compressing system would be unloaded.

By running the compressor at a higher power rate when the vehicle is coasting, it will become possible to generate a more important fraction of the total compressed air needs during those times where the vehicle is coasting, at which times the energy which is provided by the driveline comes not from burning fuel in the thermal engine 10 but from recovering the kinetic energy of the vehicle. The higher the power rate at which the air compressor system is controlled during those coasting times, the quicker the air tanks will be replenished. Therefore there will be fewer occasions for the pressure in the air tanks to become lower than the low pressure threshold when the vehicle is not coasting which would then trigger the air compressor system under the less favorable scheme. Indeed, when the vehicle is not coasting, the energy required to drive the air compressor system will require additional energy from the thermal engine 10, which amounts to additional burn fuel.

An additional advantage of the invention is that, when the vehicle is coasting, the power necessary to drive the air compressor system, which of course is increased when the air compressor system is operated at the higher power rate, has a retardation effect on the driveline similar to the engine braking effect. This additional retardation effect can help to minimize the use of the conventional friction service brakes.

Figure 3:
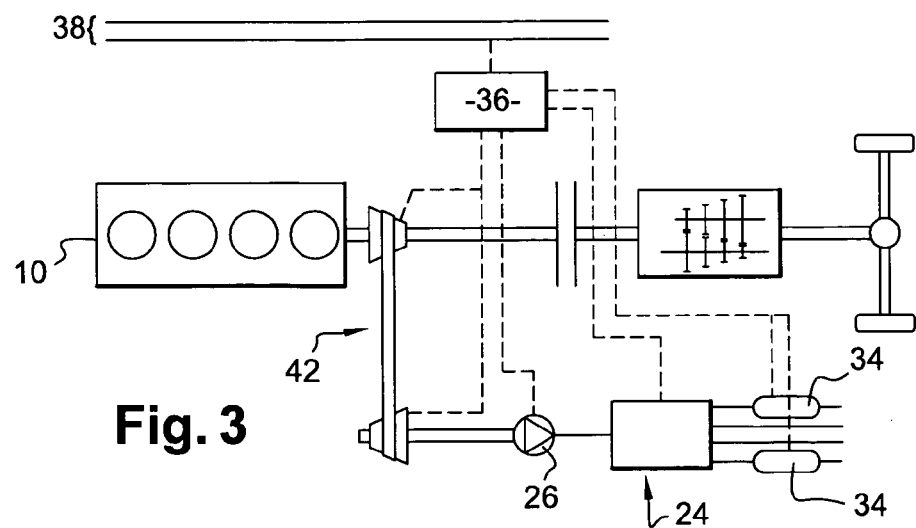
FIGS. 3 to 5 show various additional possible embodiments of the invention.

FIG. 3 represents a second embodiment of the invention wherein, compared to the embodiment of FIG. 2, the gearbox 40 and the belt and pulley transmission 28 have been replaced by a continuously variable transmission CVT 42 so that the ratio between the drive speed of the air compressor 26 and the engine crankshaft speed can be varied by the control unit 36 and can be set to one of an infinite number of values in a given range. The CVT 42 is here represented as a belt and pulley type CVT where a belt is mounted on veritable diameter pulleys. Nevertheless other types of CVT's could be used, including a CVT comprising a planetary gear having three inputs/outputs where one of the inputs/outputs would be connected to the engine crankshaft, a second of the inputs/outputs would be connected to the air compressor, and the third input/output would be connected to an electric motor to vary the speed ratios between the first two inputs/outputs. Such a CVT is for example disclosed in DE-198.01.160 for driving a coolant pump.

Here again, by varying the speed ratio of the CVT 42, the air compressor 26 will be driven at a lower speed or a higher speed, thus delivering air at a lower or higher power rate depending on whether the vehicle is coasting or not. The use of the CVT transmission has several advantages over the use of a two-step mechanical gearbox. Indeed, the transition between a lower and a higher speed ratio can be made stepless, therefore ensuring a smooth mechanical transition. Also, the higher and lower speed ratios can each be adjusted according to vehicle operating parameters. For example, the high speed ratio, which is used preferably when the vehicle is coasting, could be adjusted depending on the braking intensity required by the driver, and/or on the engine speed, and/or on the vehicle speed, and/or on the air pressure in the tanks of 34, etc . . . Similarly, the low speed ratio, which is used preferably when the vehicle is not coasting, could also be adjusted depending on the same parameters or other parameters such as the engine available torque or the instantaneous air consumption by the air consumer circuits 32. For example, when the vehicle is not coasting, the speed ratio of the CVT 42 could be controlled so as to run the compressor 26 at just the right speed in order to deliver an amount of air power corresponding to the amount of air power consumed by the various air consumers. Thus, the air demand could be satisfied by the air compressor without depleting the quantity of air stored in the air tanks 34, and without, to the contrary, absorbing unnecessary torque from the engine 10.

Figure 4:
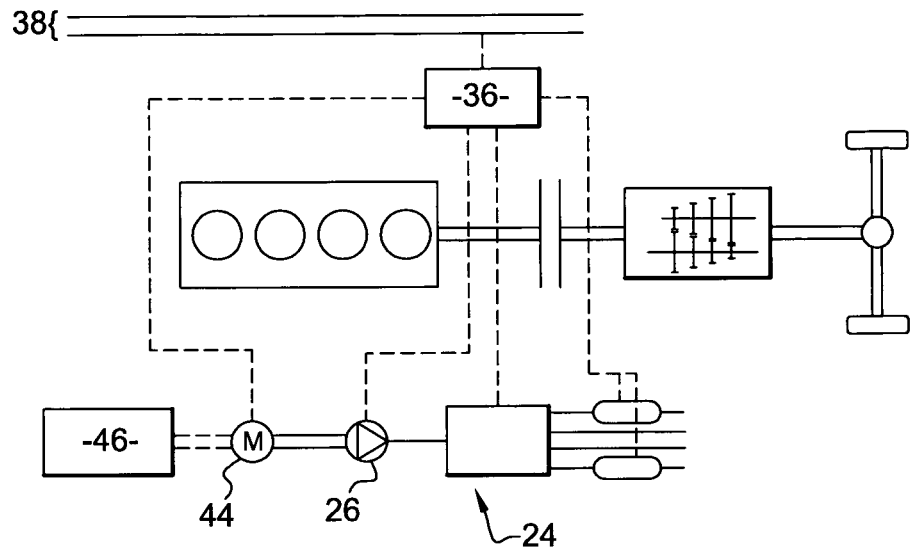

In a third embodiment of the invention represented at FIG. 4, the air compressor 26 is not any more mechanically linked and driven by the engine or the driveline. Indeed the air compressor is here driven by an electric motor 44. The electric motor itself derives its energy from a battery 46. In this embodiment, first and second power rates of the air compressor system are again obtained by varying the speed at which the air compressor is driven, simply by adjusting the speed of the electric motor 44. It is of course possible to have only two discrete predefined speeds of the motor 44, thereby emulating the two speed gearbox as described in relation to the embodiment of FIG. 2, or to take advantage of the full flexibility of the electric motor which can be driven at any speed within its operating range, thereby emulating the CVT of the embodiment of FIG. 3 with the corresponding features and advantages. For example, with the electrically driven compressor, it will be possible to the adjust the high speed ratio depending on the braking intensity required by the driver, and/or on the engine speed, and/or on the vehicle speed, and/or on the air pressure in the tanks of 34, and to adjust the low speed ratio depending on the same parameters and/or other parameters such as the engine available torque and/or the instantaneous air consumption by the air consumer circuits 32. It can be noted that, instead of controlling directly the speed of the electric motor, said motor could be controlled in terms of power or of torque. The battery 46 can be charged by a conventional alternator or by a dedicated engine driven generator.

Figure 5:
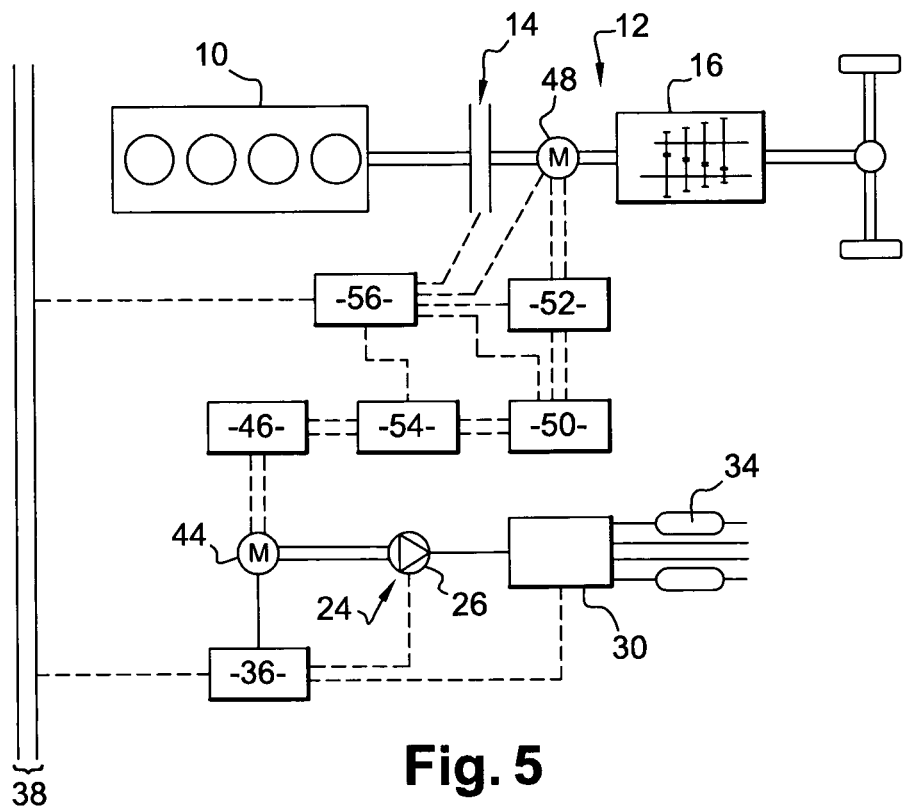

In the fourth embodiment of the invention, which is a represented at FIG. 5, the same air compressor system using an electrically driven compressor 26 is integrated in a hybrid electric vehicle. Indeed, it can be seen that the vehicle powertrain comprises, in addition to the thermal engine 10, and an electric traction motor 48 which is located on the driveline mechanically between the clutch 14 and the gearbox 16. The electric motor derives its energy from a traction battery 50 through a converter 52. As is well known, the electric motor 48 can also be operated as a generator, especially for performing the regenerative braking whereby, when the vehicle is coasting, its inertia (or kinetic energy) is transformed into electrical energy by the electric motor 48 and stored in the traction battery 50. An electrical control system, which is represented on FIG. 5 under the form of an electronic control unit 56, controls the operation of the vehicle's powertrain and driveline. Of course, such electronic control system can be split up between various physical ECU's.

The traction battery 50 is preferably a very high voltage battery, preferably at least exceeding 300 volts, for example a 600 V battery. In the example shown, the traction battery 50 is different from the other battery 46 which is used as the energy source for the motor 44 driving the air compressor 26. Indeed, the two motors 44 and 48 may have differing power capacities and it may not be optimal to use the same battery for providing electrical energy to both motors. For example, the battery 46 could be a medium voltage battery such as a battery having a nominal voltage comprised between 50 and 350 volts. In such a case, an electric converter 54 is also provided between the two batteries 46, 50 so that the electrical energy can be transferred from one battery to the other depending on the needs. Therefore, despite the fact that the batteries 46 and 50 are separate, they can nevertheless be considered together as one global electrical energy storage system for the vehicle. Such a possibility to transfer electrical energy from the traction battery 50 to the air compressor system battery 46 can prove very helpful in further optimizing the energy recovery while other vehicle is coasting.

Indeed, hybrid electric vehicles have inherently the capacity to recover energy when of the vehicle is coasting by storing it in the traction battery 50. Nevertheless, the capacity of such battery 50 is never infinite. It is a compromise between the capacity and the weight. Therefore it often appears that, when a hybrid vehicle is coasting, there is no more possibility to store any additional electricity in the traction battery 50. This has a first consequence that the remaining kinetic energy which could be recovered cannot be recovered anymore. A second consequence is that since no energy can be recovered by the electric motor 48, this motor is not able anymore to provide a resistive torque to the vehicle. One typical situation where such scenario occurs is when the vehicle is riding down a very long slope. Indeed at the beginning of the slope, the vehicle will use its electric traction motor 48 as a generator to store energy in the traction battery 50 for future use in view of driving the vehicle, and for slowing down the vehicle, or at least limiting the need to use the friction service brakes of the vehicle. When the battery 50 is full, no more electrical energy can be stored for future use to drive the vehicle and no more of the so-called regenerative braking is available.

In the embodiment according to the invention, when the vehicle is coasting, the electric motor 44 driving the air compressor 26 can be driven at high speed, thereby consuming a higher than normal amount of electrical energy from the associated battery 46. If, at the same time, the traction battery 50 is full or nearly full, it will be advantageous to transfer some electrical energy through the converter 54 from the traction battery 50 to the battery 46, thereby allowing the corresponding amount of electrical energy to be provided by the electric motor 48 to the traction battery 50. Therefore under such a circumstance, the capacity of the electrical storage system for storing energy when the vehicle is coasting is not limited to the capacity of the traction battery 50 but also includes the capacity of the battery 46 associated with the air compressor system.

In a non represented variant of this fourth embodiment of the invention, the battery 46 can be omitted, so that the motor 44 driving the compressor 26 could be directly fed by the traction battery 50 through the converter 54.

In both cases, the capacity to recover kinetic energy is increased by the fact that the recovered energy can be stored under electrical form in the electricity storing system, whether it has one or several batteries, but also under pneumatic form in the air tanks 34 that are supplied by the compressor 26. If no dedicated battery 46 is provided, it can be provided to have an increased air storing capacity, in order to keep the vehicle operative for a sufficient time in case the electric supply of the motor 44 would fail.

In the embodiment of FIG. 5, and in its variant cited above, the control of the air compressor system can take into account the status of the traction battery. Indeed, it can be organized that, even when the vehicle is coasting, the air compressor system is operated at its higher power rate only if the traction battery is full or nearly full, so as to prioritize the replenishment of the traction battery 50 over the replenishment of the air tanks.

It must be noted that any of the embodiments described above could be implemented in the context of a hybrid vehicle.

In the embodiments described above, the way to control the air compressor system at a higher power rate is to drive a compressor at a higher speed. Nevertheless, there are other ways to do so. For example it is possible to use a variable capacity compressor so that the compressor is operated with a small capacity to achieve the low power rate and is operated with a bigger capacity to achieve a high power rate. As another example, the compressor could be a two-stage compressor where one of the stages can be unloaded. When that unloadable stage is unloaded, the compressor runs as a single stage compressor and delivers air at the first lower pressure, thereby achieving a first power rate. When the unloadable stage is loaded, the compressor runs as a double stage compressor, thereby achieving a second higher power rate. A similar result could be obtained with an air compressor system having two compressors, where one of the compressors would be operated only when the vehicle is coasting. If the compressors are set in parallel, this would be analogous to a variable capacity compressor. If the two compressors are in series, with one of them being by-passable, this would be analogous to a double stage compressor. In both cases, the variable capacity or double stage compressor could be driven by a simple belt and pulley transmission such as depicted on FIGS. 1 and 2.

Of course, in all cases, it will preferably be provided that the air compressor system can also be fully unloaded. In such a case, the air compressor system may be controlled to operate in at least three operating modes: an unloaded mode where it provides substantially no pressurized air, a normal mode where it delivers pressurized air at a first power rate, and an enhanced delivery mode where it delivers pressurized air at a second higher power rate.

In all the embodiments discussed above, the determination of when the vehicle is coasting could be further refined by taking into account information coming from a navigation system providing a so called electronic horizon. Such electronic horizon contains information as to the most probable future path of the vehicle and could be used to anticipate a probable imminent coasting phase of the vehicle. For example, the navigation system could determine that the vehicle is just about to reach the top of a long downhill slope where the vehicle will be mainly coasting. If so, it may be possible that the electronic control system 36 driving the air compressor system compressor according to the invention takes such information into account when deciding whether the air compressor system should be controlled to deliver air and when deciding at which power rate it should be controlled. For example, the electronic control system could decide to postpone slightly the air delivery by the compressor, because a coasting phase is imminent. Also, in the case of a CVT driven compressor or of an electrically driven compressor, the high power rate of the compressor system could be adjusted as a function of the slope and/or length of the downhill road which is just ahead.

The invention as described above will be especially adapted for its integration in heavy vehicles such as trucks and buses having a total weight exceeding 7 tons and equipped with highly air consuming devices such as air operated brakes. Indeed, such vehicles are often equipped with compressors capable of delivering over 500 liters per minute of air at 12 bars, which requires a driving power of over 1 kW on average and up to over 10 kW at peaks.

The invention claimed is:

1. Vehicle comprising an air compressor system having at least one compressor for supplying compressed air to an air consuming circuit, wherein the vehicle comprises means for determining that the vehicle is coasting, wherein the compressor system is configured to be controlled so that the compressor delivers compressed air at a first power rate and at least at a second higher power rate, and the compressor system is configured to be controlled so that the compressor delivers compressed air at the second higher power rate when the determining means determines that the vehicle is coasting.

2. Vehicle according to claim 1, wherein the compressor system comprises at least one compressor which is driven at a higher speed when the determining means determines that the vehicle is coasting.

3. Vehicle according to claim 2, wherein the compressor is driven by an electrical motor, the speed of the electrical motor being increased when the determining means determines that the vehicle is coasting.

4. Vehicle according to claim 2, wherein the compressor is driven through a variable speed ratio transmission, and the speed ratio of the transmission is increased when the determining means determines that the vehicle is coasting.

5. Vehicle according to claim 4, wherein the variable speed ratio transmission is a stepped gear transmission.

6. Vehicle according to claim 4, wherein the transmission is a continuously variable speed ratio transmission.

7. Vehicle according to claim 4, wherein the transmission comprises at least one planetary gear.

8. Vehicle according to claim 1, wherein the compressor system is a multistage compressor system where at least one unloadable stage of the compressor can be unloaded, so that the compressor system delivers air at a first lower pressure, or can be loaded so that the compressor system delivers air at a second higher pressure, and the unloadable stage is loaded when the determining means determines that the vehicle is coasting.

9. Vehicle according to claim 1, wherein the system comprises at least one variable capacity air compressor, and a capacity of the variable capacity compressor is increased when the determining means that the vehicle is coasting.

10. Vehicle according to claim 1, wherein the air compressor system is arranged to he controlled to operate at in at least three operating modes: an unloaded mode where it provides substantially no pressurized air, a normal mode where it delivers pressurized air at the first power rate, and an enhanced delivery mode where it delivers pressurized air at the second higher power rate.

11. Vehicle according to claim 1, wherein the vehicle comprises an electronic control system which, when the vehicle is coasting, controls the air compressor system at the second higher power rate, depending on a status of vehicle operating parameters.

12. Vehicle according to claim 1, comprising a thermal traction engine, an electrical traction motor, an electricity storing system, the electrical traction motor being able to recharge the electricity storing system when the vehicle is coasting, and at least one compressed air accumulating system, wherein the vehicle comprises an electronic control system which, when the vehicle is coasting, controls the air compressor system at the higher power rate, depending on the status of the electricity storing system.

13. Method for operating a vehicle air compressor system having at least one compressor, wherein the compressor system is configured to he controlled so that the compressor delivers compressed air at a first power rate and at least at a second higher power rate, wherein the method comprises
    determining whether the vehicle is coasting, and
    controlling the compressor system so that the compressor delivers compressed air at the second higher power rate depending on the status of vehicle operating parameters, including whether the vehicle is coasting.

14. Method according to claim 13, wherein the vehicle further comprises a thermal traction engine, an electrical traction motor, an electricity storing system, the electrical traction motor being able to recharge the electricity storing system when the vehicle is coasting, and at least one compressed air accumulating system, wherein the step of controlling the compressor system so that the compressor delivers compressed air at the second higher power rate depends on a status of the electricity storing system.

* * * * *